(12) United States Patent
Dundas

(10) Patent No.: US 7,168,451 B1
(45) Date of Patent: Jan. 30, 2007

(54) REMOVABLE HOSE COVER

(76) Inventor: Robert D. Dundas, 5306 W. Missouri, Glendale, AZ (US) 85301

( * ) Notice: Subject to any disclaimer, the term of this patent is extended or adjusted under 35 U.S.C. 154(b) by 0 days.

(21) Appl. No.: 11/347,967

(22) Filed: Feb. 6, 2006

(51) Int. Cl.
*F16L 35/00* (2006.01)

(52) U.S. Cl. ................ 138/110; 138/109; 138/155; 138/96 R; 285/305

(58) Field of Classification Search ........... 138/110, 138/109, 114, 120, 155, 96 R, 96 T; 285/305, 285/123.15, 123.16
See application file for complete search history.

(56) References Cited

U.S. PATENT DOCUMENTS

| | | | | |
|---|---|---|---|---|
| 656,765 | A | | 8/1900 | Copeland ................ 285/322 |
| 2,597,482 | A | | 5/1952 | Harrison et al. ........... 285/305 |
| 3,527,485 | A | | 9/1970 | Goward et al. ............ 285/305 |
| 3,735,928 | A | | 5/1973 | Watts et al. .................. 138/89 |
| 3,773,087 | A | * | 11/1973 | Katayama ................ 138/120 |
| 3,822,074 | A | | 7/1974 | Welcker .................... 285/305 |
| 3,829,136 | A | | 8/1974 | Eldelberg ................... 285/383 |
| 3,860,274 | A | | 1/1975 | Ledstrom et al. ........... 285/312 |
| 3,973,791 | A | | 8/1976 | Porta et al. ................ 285/305 |
| 4,243,253 | A | * | 1/1981 | Rogers, Jr. ................... 285/45 |
| 4,260,184 | A | | 4/1981 | Greenawalt et al. ........ 285/305 |
| 4,289,339 | A | | 9/1981 | Hansen ..................... 285/305 |
| 4,367,967 | A | * | 1/1983 | Albert, Jr. ..................... 403/41 |
| 4,431,218 | A | | 2/1984 | Paul, Jr. et al. ............. 285/305 |
| 4,643,229 | A | * | 2/1987 | Hickin ...................... 138/109 |
| 4,805,933 | A | * | 2/1989 | Swisher ....................... 285/38 |
| 4,923,350 | A | | 5/1990 | Hinksman et al. .......... 411/457 |
| 5,316,348 | A | * | 5/1994 | Franklin ...................... 285/39 |
| 5,334,064 | A | | 8/1994 | Ketterman et al. ........... 441/42 |
| 5,367,925 | A | * | 11/1994 | Gasparre .................. 81/121.1 |
| 5,816,622 | A | * | 10/1998 | Carter ........................ 285/45 |
| 5,857,711 | A | * | 1/1999 | Comin-DuMong et al. ... 285/38 |
| 5,863,079 | A | | 1/1999 | Donais et al. ................ 285/45 |
| 5,964,483 | A | | 10/1999 | Long et al. ................. 285/305 |
| 6,182,347 | B1 | | 2/2001 | Reed et al. ................... 285/39 |
| 6,494,495 | B1 | | 12/2002 | Cunningham ................ 285/91 |
| 6,612,619 | B2 | | 9/2003 | Wieder ....................... 285/23 |
| 6,634,677 | B2 | | 10/2003 | Mehr ........................ 285/305 |
| 6,908,119 | B2 | | 6/2005 | Murken ..................... 285/305 |

* cited by examiner

*Primary Examiner*—Patrick F. Brinson
(74) *Attorney, Agent, or Firm*—Frank J. McGue

(57) ABSTRACT

A removable hose cover comprises a hose cover which is adapted to telescopically receive a hose therein. The hose cover has at least one hose cover end fitting on one end thereof and the hose has at least one end fitting on one end thereof, The hose cover end fitting is slidably received over the end fitting. The hose cover fitting and the end fitting are releasably connected to each other.

3 Claims, 2 Drawing Sheets

REMOVABLE HOSE COVER

TECHNICAL FIELD

This invention relates generally to the field of hose covers, and, more particularly, to a removable hose cover using pin groove fittings.

BACKGROUND OF THE INVENTION

In the hose industry, many variables affect the safety, longevity and the ability of the hose to protect the user or other persons in close proximity thereto. The present invention relates to such hose protection, maintenance of said hoses and enhancing the safety of said hoses for both operators and equipment.

In one typical application shown in FIG. 1, namely, non-heated asphalt applicators, hoses are generally rubber hoses 10 with a mill hose cover 12 slipped over the hose and secured thereto using boss lock type fittings 14 or other bolt type fittings as well as nylon clamps, metal hose clamps or even wire and tape. Once mill hose cover 12 is clamped under fittings 14, it can no longer be removed for inspection if needed or replacement if worn unless a corresponding end hose fitting 16 is also removed. Thus, quite often hoses 10 are often unnecessarily replaced when the only major defect is the hose cover 12 and not the underlying hose 10.

More seriously, if end hose fitting 16 were to blow off in a catastrophic hose failure, boss lock fittings 14 do not restrain end hose fittings 16 or the material being pumped therethrough under pressure. This can result in serious safety issues depending upon the media being pumped through hose 10 and the pressure used for said pumping.

Thus, there is a need for a removable hose cover which is easy to remove for hose inspection or replacement and further provides a restraining means in the event of catastrophic hose failure.

SUMMARY OF THE INVENTION

It is an object of this invention to provide a removable hose cover.

It is an further object of this invention to provide a removable hose cover which is easily and quickly removed;

It is still another object of this invention to provide a removable hose cover which provides protection in the event of a catastrophic hose failure.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figures 1, 2, 3, 4:
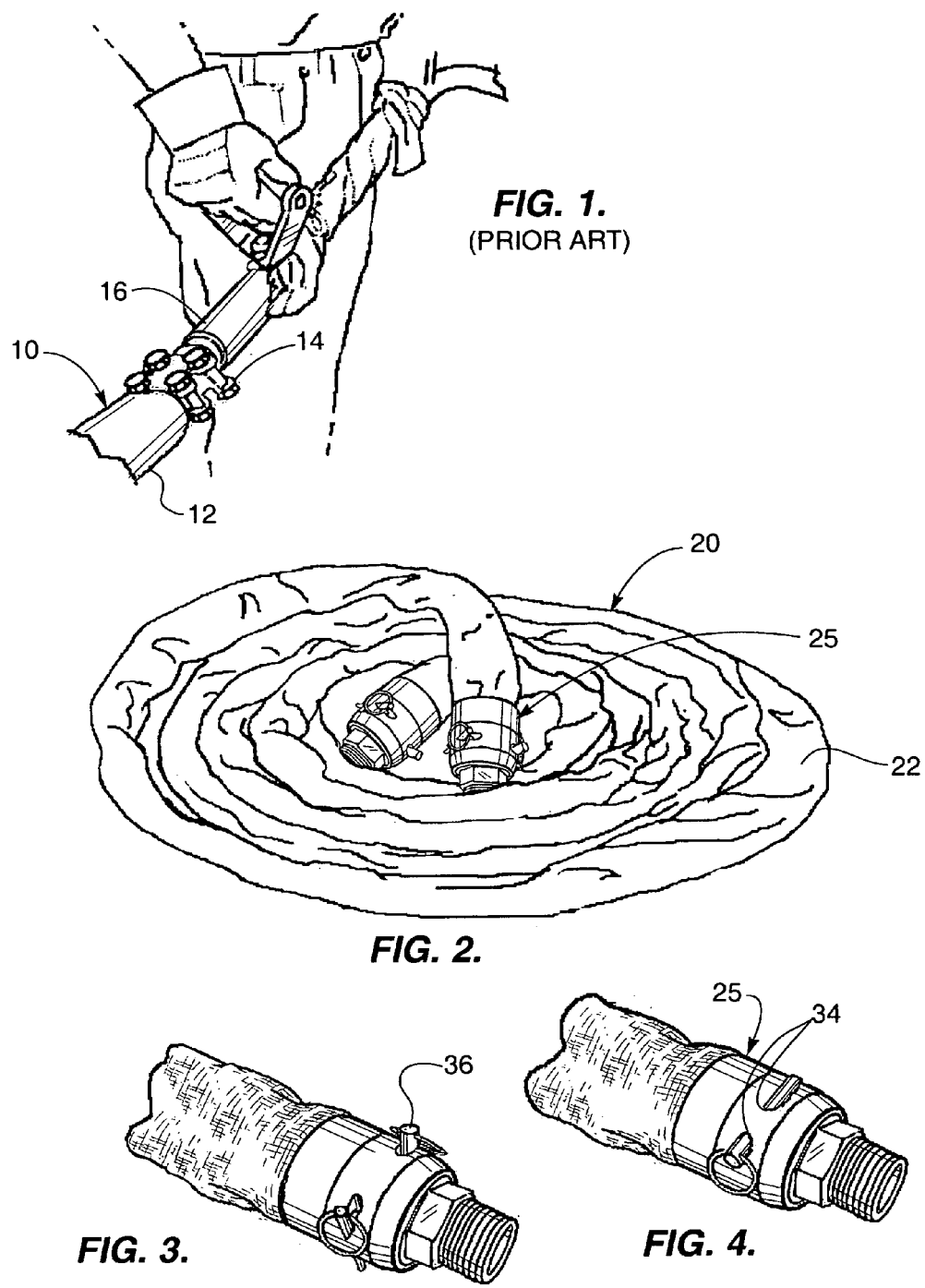
FIG. 1 is perspective view of a hose cover of the prior art in use.
FIG. 2 is a perspective view of a hose equipped with a removable hose cover of the present invention.
FIG. 3 is a close up view of a pin groove fitting of the present invention.
FIG. 4 is a close up view of an alternate embodiment of the pin groove fitting of the present invention.

Referring more particularly to the drawings by characters of reference, FIGS. 2–5 disclose combinations of features which constitute the components of a removable hose cover 20 of the present invention. In the one exemplary embodiment, removable hose cover 20 comprises a yellow fire hose cover 22. Fire hose cover 22 provides for safety and containment in the event of a breach of the hose layers underneath. However, the present invention is not meant to be limited to use with fire hose cover 22 and those skilled in the art will recognize that many other hose covers are suitable for use with the present invention depending upon the particular application desired.

Removable hose cover 20 comprises hose cover 22 which is adapted to telescopically receive a hose 24 therein. Hose cover 22 has at least one hose cover end fitting 30 on one end thereof while hose 24 has at least one end fitting 26 on one end thereof. Hose cover end fitting 30 is slidably received over end fitting 26. Hose cover end fitting 30 and end fitting 26 are releasably connected to each other.

In the presently preferred embodiment, fire hose cover 22 covers hose 24 and is releasably affixed thereto by a pin groove fitting 25 which comprises, in combination, a radial groove 28, at least one pair of holes 34 and a quick release pin 36 as described in more detail below. Those skilled in the art will recognize that the use of pin groove fitting 25 is exemplary in nature and that other mechanisms to releasably affix fire hose cover 22 to hose 24 are possible. Such other mechanisms include, but are not limited to, a cam lock using a cam and groove fitting, a quick disconnect using a ball and groove design or nylon zip tics.

Figure 5:
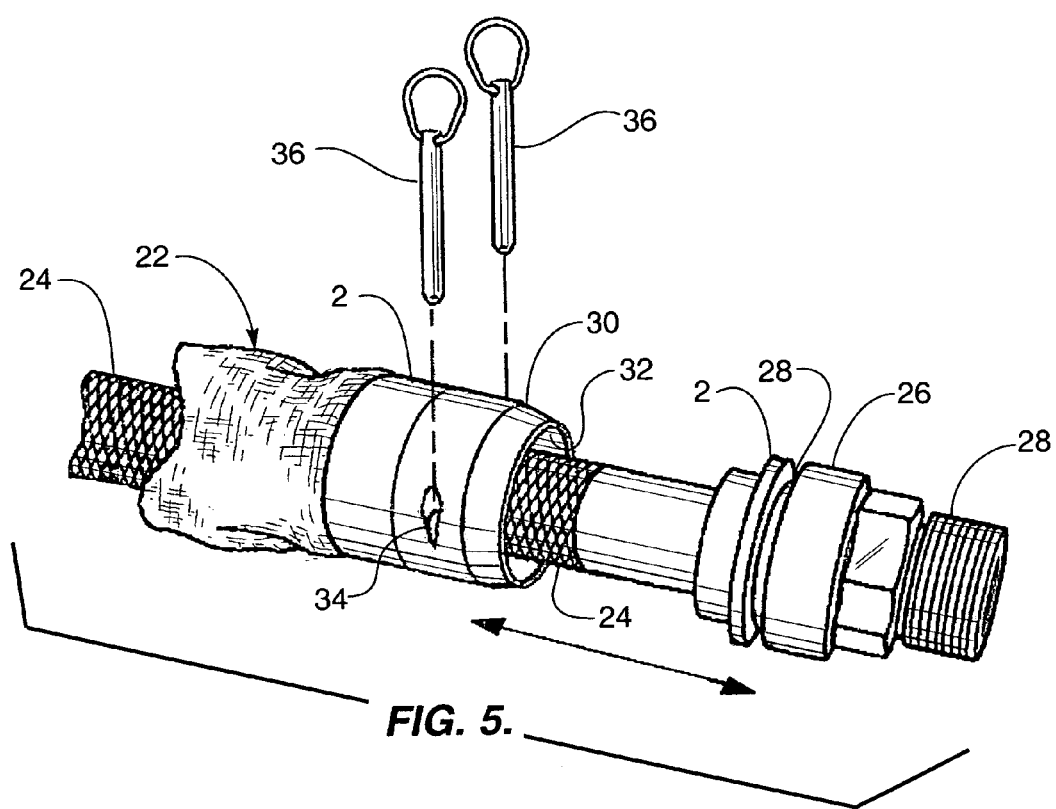
FIG. 5 is an exploded view of the embodiment of FIG. 3.

As best seen in FIG. 5, hose 24 has end fitting 26 which allows hose 24 to be connected as desired. In the illustrated embodiment, end fitting 26 provides a male thread for attachment to a corresponding female fitting (not shown). Those skilled in the art will recognize that the use of end fitting 26 is exemplary in nature and that the present invention is not limited to that particular configuration. In the present invention, end fitting 26 is provided with radial groove 28 machined about the diameter of said end fitting.

As shown, removable hose cover 20 is provided at each end with hose cover end fittings 30 whose bore 32 is large enough to allow hose cover end fitting 30 to slide over and off of end fitting 26 when needed. At least one pair of holes 34 as shown in FIG. 4, and preferably two pairs of holes 34 as shown in FIGS. 3 and 5, are provided in hose cover end fitting 30. Each pair of holes 34 is adapted to receive a quick release pin 36 therethrough To use, hose cover end fitting 30 is slid over end fitting 26 to align holes 34 with radial groove 28. When quick release pins 36 is inserted into holes 34, quick release pin 36 is captured in radial groove 28. With quick release pin 36 extending through both holes 34 and being captured in radial groove 28, end fitting 26 and hose end cover 30 are locked in position. Simple removal of quick release pin 36 allows hose end cover fitting 30 to slide off of end fitting 26 as needed for replacement or inspection as needed.

Those skilled in the art will recognize that in the event of a catastrophic failure where end fitting 26 separates from hose 24, the present invention prevents said fitting 26 from being completely disengaged as it will still be attached to hose end cover fitting 30. In addition, a flood of potentially dangerous media from hose 24 is prevented in such a failure by keeping end fitting 26 attached to hose end cover fitting 30.

Although only certain embodiments have been illustrated and described, it will be apparent to those skilled in the art that various changes and modifications may be made therein without departing from the spirit of the invention or from the scope of the appended claims.

What is claimed is:

1. A removable hose cover comprises a seamless fire hose cover which is adapted to telescopically receive a hose therein, the hose cover having at least one hose cover end fitting permanently attached on one end thereof, the hose having at least one end fitting on one end thereof, the hose cover end fitting slidably received over the end fitting, the hose cover end fitting and the end fitting being adapted to releasably connect to each other by a a pin groove fitting.

2. The removable hose cover of claim 1 wherein the pin groove fitting comprises a radial groove in the end fitting, at least one pair of holes extending through the hose end cover fitting, the at least one pair of holes adapted to receive a quick release pin therethrough whereby when the at least one pair of holes is aligned with the radial groove and the quick release pin is inserted therethrough, the quick release pin is captured in the radial groove thereby locking the end fitting and the hose end cover fitting together.

3. A removable hose cover comprises a seamless fire hose cover which is adapted to telescopically receive a hose therein, the hose cover having at least one hose cover end fitting permanently attached on one end thereof, the hose having at least one end fitting on one end thereof, the hose cover end fitting slidably received over the end fitting; the hose cover fitting and the end fitting being adapted to releasably connect by a pin groove fitting, the pin groove fitting comprising a radial groove in the end fitting, at least one pair of holes extending through the hose end cover fitting, the at least one pair of holes adapted to receive a quick release pin therethrough whereby when the at least one pair of holes is aligned with the radial groove and the quick release pin is inserted therethrough, the quick release pin is captured in the radial groove thereby locking the end fitting and the hose end cover fitting together.

* * * * *